Figure 1:
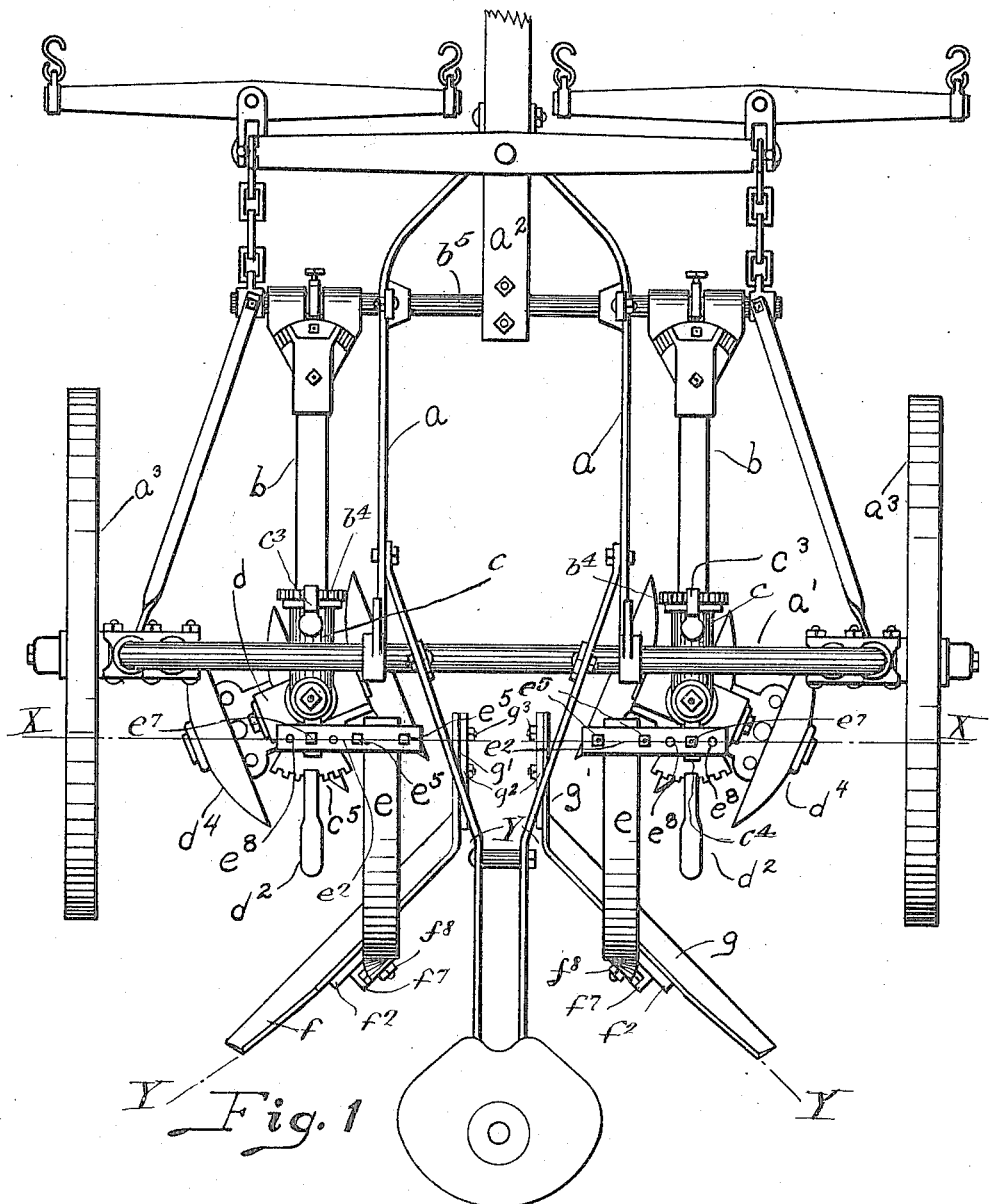

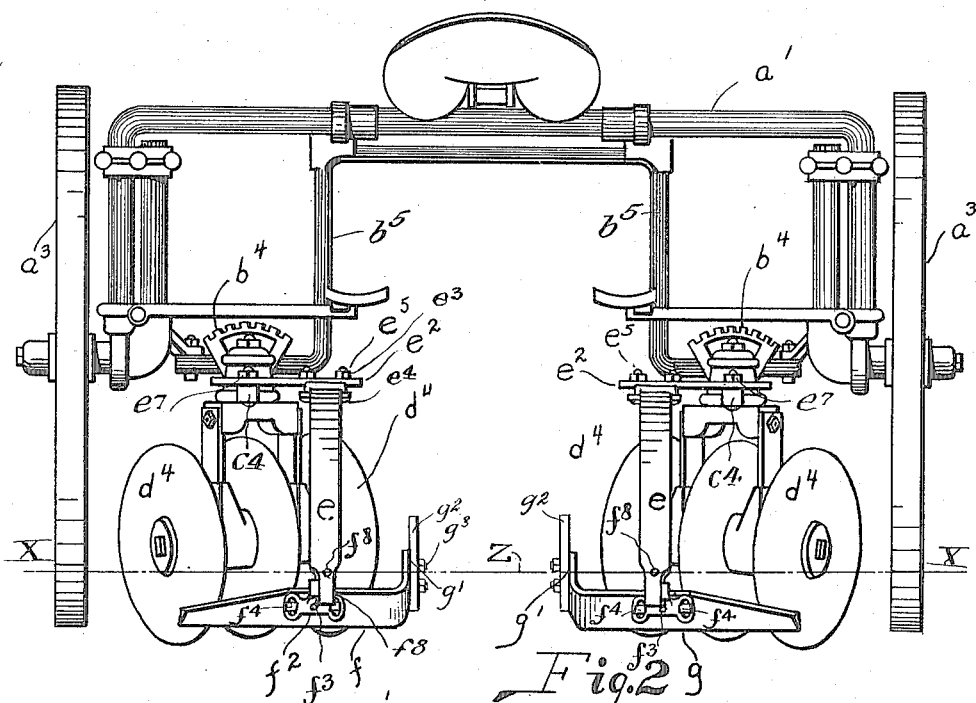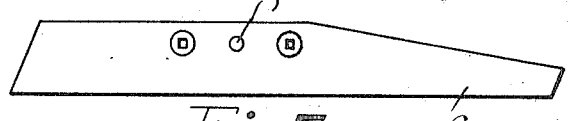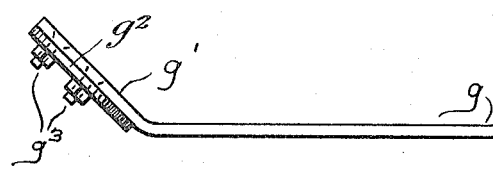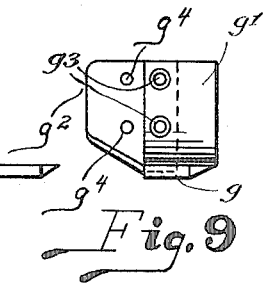

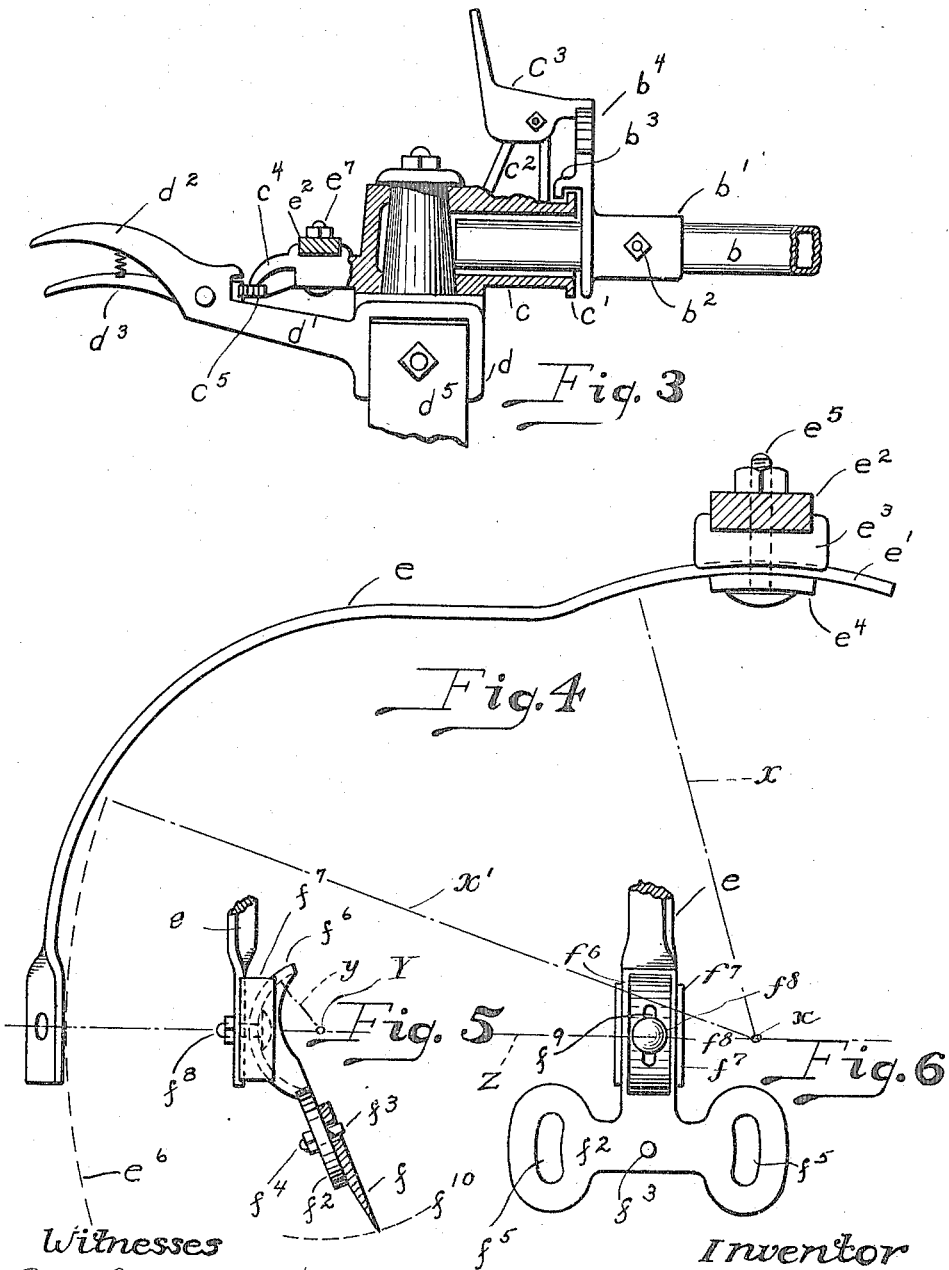

UNITED STATES PATENT OFFICE.

ALVARO S. KROTZ, OF JANESVILLE, WISCONSIN.

DISK CULTIVATOR.

1,196,549.

Specification of Letters Patent.

Patented Aug. 29, 1916.

Application filed December 6, 1911. Serial No. 664,294.

*To all whom it may concern:*

Be it known that I, ALVARO S. KROTZ, a citizen of the United States, residing at Janesville, in the county of Rock, State of Wisconsin, have invented certain new and useful Improvements in Disk Cultivators; and I do hereby declare the following to be a full, clear, and exact description of the invention, such as will enable others skilled in the art to which it appertains to make and use the same.

My invention relates to leveling attachments for cultivators in general, but more particularly to those for use with disk cultivators.

Generally stated, the object of my invention is to provide a simple, inexpensive and novel attachment for leveling the ridges that are formed by the gangs of disks, or by individual disks, whereby the soil will be left smooth and level, or at any desired angle, thus insuring a perfect condition of soil surface without planking.

A further object of my invention is to avoid the tendency of the soil to stick to the leveler blades, by slanting or inclining them back to such an extent that the loose soil is lifted as it travels across the face of the blade.

A further object of my invention is to construct and locate the blades in such manner that each one can be made in one piece and given a cutting edge whereby the weeds and grass which are not cut and turned by the disks will be cut off by the leveling attachment, the raising effect of the earth assisting in drawing the weeds and grass across the cutting edge.

My invention has as a further object the providing of adjustable means whereby the blade angle, height, lateral position and the disk angle are adjustable, each independently of the other.

A further object of my invention is to provide a flat spring beam for the leveler blade, whereby the blade is held in normal working position, but permitted to rise over obstructions, and to also provide a limited vibration or yielding effect so as to more perfectly clear itself of the trash and earth.

A further object is to provide an improved construction and arrangement whereby adjustment of the blade angle and height is obtained by means of curved surfaces, as will hereinafter more fully appear.

These objects are accomplished by the use of a suitably shaped blade, one to each gang, attached to the gang by means of a flexible beam, the blades trailing behind the gangs at angles opposite to the directions of the disks, and tilted back so as to move the earth in the quantity wanted, whereby the soil thrown inward by the disks is then leveled and thrown outward by said blades, as illustrated in the accompanying drawings which show a simple and preferred form of my invention, and whereof—

Figure 1 is a plan view showing the essential parts of a cultivator with a leveling attachment combined therewith, embodying the principles of my invention. Fig. 2 is a rear elevation of a disk cultivator with my improved leveler attached. Fig. 3 is a side elevation of the gang to which my improvement is attached, the gang head being in section to show the swivel or pivot bearings. Figs. 4 and 5 are detail views of my invention. Fig. 6 is a front view of the blade bracket or shank and its connection to the leveler beam. Fig. 7 is a front elevation of one form of leveler blade which may be employed. Fig. 8 shows a modified form of leveler blade, such as those shown in Figs. 1 and 2. Fig. 9 is an end view of the same.

Corresponding parts in the different figures are indicated by like reference characters.

Referring to the several drawings, $a$ indicates the cultivator frame, $a^1$ the axle arch, $a^2$ the pole, $a^3$ the wheels of a pivot axle cultivator. However, any type of cultivator can be used. Any type of gang can also be used. The details of the gang are shown only as a preferable form to which my invention is best suited.

Refering to Fig. 3, $b$ indicates the gang beam which, in this case, is a square tube. The bracket $b^1$ is bolted to the beam $b$ by bolt $b^2$. This bracket at its rear supports a lip $b^3$, and at its upper end a toothed sector $b^4$. The beams $b$ are suitably mounted at their forward ends on the lower outturned end portions of the arch $b^5$, in a well known manner, whereby each beam is adapted to swing up and down about a horizontal axis.

The gang head $c$ is freely journaled over the end of the tube $b$, and is provided with a flange $c^1$ which is held between the lip $b^3$ and bracket $b^1$. The post $c^2$ is a part of $c$ and forms a pivot for the hand ratchet $c^3$, which ratchet is provided with teeth to mesh into the toothed sector $b^4$. The head $c$ can therefore be set and held at any desired tilt or angle about a horizontal axis in relation to the beam $b$.

The rearward extending bracket $c^4$ supports a toothed sector $c^5$ the purpose of which will be explained later.

The disk head $d$ is freely journaled in $c$, as shown, and has an arm $d^1$ which forms a handle $d^2$ and supports a toothed latch $d^3$. The teeth of this latch mesh into the toothed sector $c^5$ and permit the disk head to be set and held at any desired angle about a vertical axis. The disks $d^4$ are attached to the head $d$ in the usual manner through bearings and posts $d^5$. It is obvious the disks can be set at any desired angle, horizontal or perpendicular, by means of the levers $c^3$ and $d^2$.

The leveler beam $e$ is preferably made of flat spring steel. The front end portion has the curve $e^1$ which may be on a larger radius than the body of the beam $e$. At the rear end the beam is twisted as shown. The purpose of this twist will be explained later. The beam $e$ is attached to the leveler bar $e^2$ by means of the beam block $e^3$, pad $e^4$ and bolts $e^5$, the curvature of the beam block $e^3$ and pad $e^4$ being the same as curve $e^1$, so that the beam $e$ can be adjusted by swinging on the radius point of the curve $e^1$; and by reason of this radius center the rear or free end of the beam $e$ rises and lowers on a path indicated by dotted line $e^6$, or in practically a vertical direction, so that the distance between the blade and disks remain practically the same throughout its entire adjustment. The bar $e^2$ is held rigidly to $c^4$ by means of the bolt $e^7$, and the holes $e^8$ provided for lateral adjustment of the leveler.

The blade $f$ is sharpened on its bottom edge and is provided with a hole $f^1$ which pivots on the blade pad $f^2$ by means of the lug $f^3$ and the bolts $f^4$ hold the blades rigidly to the blade pad $f^2$. These bolts pass through the slots $f^5$, so that the blade can be tilted on its pivot $f^3$ to any desired angle independently of the gang head $c$.

The blade pad $f^2$ is provided with a curved tongue $f^6$. The blade block $f^7$ is flanged over the angled or free end of beam $e$ and is recessed on its face so that the tongue or curved shank portion $f^6$ fits freely into the recess, and may have a rotary motion therein. The bolt $f^8$ holds this blade block $f^7$ and tongue $f^6$ firmly on the end of the beam $e$. By reason of the curvature of the tongue $f^6$ the angle of the blade $f$ is adjustable as indicated by the dotted line $f^{10}$ in Fig. 5, and therefore the depth of the cutting edge is not changed to any extent when it is necessary to change the incline or cutting slant of said blade. Tongue $f^6$ has a vertical slot $f^9$ for bolt $f^8$.

Referring to Fig. 1, it will be noted that the blades stand at a reverse angle to that of the disks. This angle is provided for by the twist in the rear end of each beam $e$. In this cultivator the gangs straddle the row of plants or stalks and throw the dirt toward the row and the blades throw it back and away from the row. This, however, can be reversed, or the disks can be set to throw the earth away from the row, and by placing the right hand levelers on the left hand gang, and vice versa, the earth would then be thrown toward the row by the blades, but away from the row by the disks. If desired, the leveler blades can both be of the character shown in Fig. 7, in which latter figure the blade $f$ is straight from end to end, and is not provided at its inner end with the shield or guard shown in Figs. 1 and 2.

Referring to Figs. 8 and 9, the inner end of the blade $g$ is bent, forming a blade guard $g^1$, indicated at the right in Fig. 2; and by reason of the inclined position of the blade, the said bent end will extend forward and upward and ahead of the rear edge of the inside disk $d^4$. It is obvious that by changing the incline or slant of the blade, more or less soil can be allowed to pass under the guard $g^1$. The blade guard plate $g^2$ consists of a flat piece of steel and serves as an additional shield to prevent the dirt or soil from falling over the guard $g^1$. It is attached to guard $g^1$ by means of bolts $g^3$, and the holes $g^4$ provide for a vertical adjustment. If desired, the blade guard $g^1$ can be curved on its lower front end to form a runner which will more readily pass over trash or obstructions. The blade $f$ is provided with a similar guard, as shown in Figs. 1 and 2.

It will be seen that each adjustment provided is independent, and with the leveler attachment connected to the gang head instead of to the disk head, the changing of the disk angle does not affect or disturb the leveler blades; but at the same time these blades can be readily adjusted for more or less depth or angle independently of the gang head.

Referring to Figs. 4, 5 and 6, it will be seen that the leveling blade mounted on the beam or spring bar $e$ is raised and lowered about an axis X, and that said blade is tilted to move its lower edge forward or backward about an axis Y, these two axes being in the same, or substantially the same, horizontal plane, when the gangs are in normal condition. The axis X extends at right angles to the direction of travel, and the axis Y extends obliquely to the said direction of travel, when the cultivator is viewed from above. (See Fig. 1.) Of course, when the gang is tilted sidewise about its longitudinal axis, as previously explained, the common horizontal plane of the axes X and Y is then tilted to an inclined position. Also, when the blade is raised and lowered, the axis Y is accordingly raised and lowered, and the common plane of the axes X and Y is then tilted either forward or backward and is no longer exactly horizontal. But, as explained, the two axes X and Y are substantially in the same plane, at all times, and ordinarily this plane is substantially horizontal. The portion $e^1$ of the beam $e$ swings on the radius $x$, and the blade itself swings on the radius $x^1$, when the blade is raised and lowered. Thus the common plane Z of the two axes X and Y is horizontal, or substantially horizontal, when the gang is in an upright or a level position, and when the blade occupies a position substantially midway between the highest and lowest positions thereof, as indicated in Fig. 4. When the blade is raised, this plane Z then tilts forward about the axis X, and when the blade is lowered the said plane then tilts backward, but the axis Y always remains in this plane. As indicated in Fig. 1, the axis X is common to the two blades $f$ and $g$, when the two gangs are exactly upright and level; but under other conditions, as will be readily understood, the two axes about which the two blades are raised and lowered are not coincident and may extend at an angle to each other. Also, under the conditions shown in the drawings, the two axes Y about which the two blades are adjusted to give them the right cutting slant are in one and the same plane (the plane Z), but when the gangs are tilted sidewise these two axes then occupy different planes, each plane including the axis about which its allotted blade is raised and lowered. In Fig. 2 the condition of the different parts is such that the axes X and Y of both blades are located in the plane indicated by the dotted line Z, which latter is also the common axis X about which the two blades may be raised and lowered or swung up and down while the parts are in this condition.

What I claim as my invention is:—

1. In a cultivator, means for throwing the soil sidewise in one direction, and a blade behind said means, disposed at an angle to throw the soil in the opposite direction, provided with a lower ground engaging edge, the front surface of said blade having a rearward slant, and mechanism for changing the slant of the blade, serving to maintain the opposite ends of the blade at substantially a given depth during such adjustment thereof.

2. In a cultivator, means for throwing the soil sidewise in one direction, and a blade behind said means, disposed at an angle to throw the soil in the opposite direction, provided with a lower cutting edge, a beam for said blade, and devices for adjustably connecting the rear end of said beam with said blade, having provisions for tilting the blade forward and back about a horizontal axis to vary the cutting slant thereof, said axis being disposed at an angle substantially the same as said angle of the blade.

3. In a cultivator, means for throwing the soil sidewise in one direction, and a blade behind said means, disposed at an angle to throw the soil in the opposite direction, provided with a lower cutting edge, a beam for said blade, a curved seat on the rear end of said beam, a shank attached to said blade, provided with a rounded portion fitting said seat, said rounded portion having a vertical slot, and a bolt extending through said beam and seat and slot, said shank thereby adjustable about a horizontal axis to vary the cutting slant of the blade.

4. In a cultivator, means for throwing the soil sidewise in one direction, and a blade behind said means, disposed at an angle to deflect the soil in the opposite direction, said blade having a rearward slant and being provided with a lower cutting edge, a mounting for said blade constructed and arranged to hold the blade in position to cut into the ground when the cultivator is moved forward, and mechanism for changing the deflecting angle of said means without disturbind said mounting and without changing either the angle or the slant of the blade.

5. In a cultivator, means for throwing the soil sidewise in one direction, and a blade behind said means, disposed at an angle to throw the soil in the opposite direction, provided with a lower ground engaging edge, a beam for said blade, a swivel head for changing the deflecting angle of said means, a bar adjustably mounted on said head, and means for attaching said bar to said beam crosswise thereof, the said swivel head being operable about a vertical axis without disturbing said bar.

6. In a cultivator, means for throwing the soil sidewise in one direction, and a blade behind said means, disposed at an angle to throw the soil in the opposite direction, provided with a lower cutting edge, a guard for the forward end of said blade, serving to keep the soil in front of said blade, said guard being carried on the forward end of said blade, and means between the ends of said blade to adjust the position thereof.

7. In a cultivator, having means for throwing the soil sidewise in one direction, a blade behind said means, disposed at an angle to throw the soil in the opposite direction, provided with a lower cutting edge, a soil guard on the front end of said blade, and a vertically adjustable plate secured to said guard and extending a distance above the upper edge thereof.

8. In a cultivator, means for throwing the soil sidewise in one direction, and a blade behind said means, disposed at an angle to throw the soil in the opposite direction, a support for said blade, mechanism for adjusting said means about vertical and horizontal axes without unfastening said support, means for adjusting said support laterally without changing the angle of the blade, and a draft beam common to said means and blade.

9. In a cultivator, means for throwing the soil sidewise in one direction, and a blade behind said means, disposed at an angle to throw the soil in the opposite direction, provided with a lower ground engaging edge, a beam for said blade, extending upward and forward therefrom, and devices for adjusting said beam about a horizontal axis disposed below the forward end portion thereof, for changing the position of the beam relative to said means, and to vary the position of the blade up and down a distance behind said means without materially changing the distance between said means and blade, said axis extending transversely of the direction of travel of said cultivator.

10. In a cultivator, means for throwing the soil sidewise in one direction, and a blade behind said means disposed at an angle to throw the soil in the opposite direction, provided with a lower ground engaging edge, a beam for said blade, extending upward and forward therefrom, the forward portion of said beam being curved about a horizontal axis disposed directly below the same, and a clamp for holding said curved portion for endwise adjustment therein about said axis to raise and lower the blade without materially changing the distance between said blade and means, said axis extending transversely of the direction of travel of said cultivator.

11. In a cultivator, means for throwing the soil sidewise in one direction, and a blade behind said means, disposed at an angle to throw the soil in the opposite direction, provided with a lower cutting edge, devices for permitting the blade to be tilted up and down at opposite ends thereof, about an axis extending upward and forward relative to the direction of travel of said cultivator and at an angle to said direction, said devices being constructed and arranged to hold the blade in position to cut into the ground when the cultivator is moved forward, and devices for changing the position of said axis relative to said means.

12. In a cultivator, means for throwing the soil sidewise in one direction, and a blade behind said means, disposed at an angle to throw the soil in the opposite direction, provided with a lower cutting edge, a beam for said blade, a shank attached to said blade, and devices for attaching the shank to the beam, constructed and arranged to hold the blade in position to cut into the ground when the cultivator is moved forward, means for adjusting said shank about a horizontally disposed axis, said shank having slots, a pivot below said axis for said blade, said pivot disposed between said slots, and bolts in said slots, fixed to said blade, the latter thereby adjustable about said pivot to raise or lower the opposite ends thereof, said pivot providing an axis extending forward and upward relative to the direction of travel of said cultivator, and at an angle to said direction.

13. In a cultivator, means for throwing the soil sidewise in one direction, and a blade behind said means, disposed at an angle to throw the soil in the opposite direction, a flexible and resilient beam for said blade, permitting the blade to rise and fall, and a mounting carried by said means, said mounting having devices for adjusting said beam thereon relative to said means to raise and lower the blade about an axis extending transversely of the direction of travel, practically without changing the distance between said blade and means.

14. In a cultivator, means for throwing the soil sidewise in one direction, and a blade behind said means, disposed at an angle to throw the soil in the opposite direction, a flexible and resilient beam for said blade, extending forward therefrom, said beam having the upper portion thereof curved about a transverse axis disposed in front of the blade, directly below said portion, and devices for holding said curved portion to permit endwise adjustment thereof about said axis, thereby to raise and lower said blade, said curvature of the beam serving in effect to swing said blade up and down relative to said means about said axis to regulate the action thereof, practically without changing the distance between said blade and means.

15. The combination of a cultivator gang, a draft connection for said gang, means at the forward end of said connection to permit up and down swinging movement of said gang, means at the rear end of said connection to afford adjustment of said gang about a vertical axis, means to permit adjustment of said gang about an axis extending longitudinally of said connection, a blade behind said gang, means affording adjustment of said blade about three separate axes of movement, without disturbing the position of said gang, and means whereby the blade is adjustable bodily and laterally of the cultivator.

16. In a cultivator, means for throwing the soil sidewise in one direction, a blade behind said means, disposed at an angle to throw the soil in the opposite direction, provided with a lower cutting edge, and instrumentalities including resilient means for yieldingly holding said blade in position with its lower edge in advance to cut edgewise into the ground, said instrumentalities having provisions for adjusting the blade up and down, and for keeping the same in proper position for all working depths thereof.

17. In a cultivator, means for throwing the soil sidewise in one direction, and a blade behind said means, disposed at an angle to throw the soil in the opposite direction, provided with a lower ground engaging edge, devices for shifting the blade sidewise, means between the ends of the blade to adjust the position thereof, and adjusting mechanism for raising and lowering said blade relative to said soil throwing means, said mechanism having provisions to maintain the blade a predetermined distance behind said means for all working depths thereof.

18. In a cultivator, means for throwing the soil sidewise in one direction, and a blade behind said means, disposed at an angle to deflect the soil in the opposite direction, provided with a lower cutting edge, a swivel for tilting said means sidewise about a forwardly extending axis, and a support for said blade, mounted to tilt with said means, constructed and arranged to hold the blade in position to enter the ground when the cultivator is moved forward, said support having means for adjusting the position of the blade thereon, by movement of the blade about two axes disposed in substantially the same plane below said swivel, to insure the desired cutting and deflecting action thereof.

19. In a cultivator, means for throwing the soil sidewise in one direction, and a blade behind said means, disposed at an angle to deflect the soil in the opposite direction, provided with a lower cutting edge, a vertical swivel providing an upright axis of adjustment for said means, a horizontal swivel providing a forwardly extending axis of adjustment for said means, said blade being movable about said axis, and devices for positioning said blade, by adjustment thereof about two axes disposed at angles to each other in a plane below said forwardly extending axis, to insure the desired cutting and deflecting action thereof.

20. In a cultivator, means for throwing the soil sidewise in one direction, and a blade behind said means, disposed at an angle to throw the soil in the opposite direction, a support for said blade, carried by said means, mechanism for adjusting said means about a vertical axis without disturbing said support, devices for adjusting said support about a horizontal axis disposed in advance of said blade, without disturbing said means, thereby to raise and lower the blade bodily, a draft beam common to said means and blade, and means affording adjustment of said blade to regulate the action thereof.

21. The combination of an implement for displacing the soil, arranged to move up and down about a forward axis of adjustment, a draft beam for said implement, having a forward end portion curved about said axis, which axis is disposed at right angles to the direction of travel when viewed from above, means to support the curved portion of said beam for said adjustment thereof about said axis, and devices to shift said beam bodily in the direction of said axis.

22. The combination of an implement for displacing the soil, arranged to move forward and back about an axis of adjustment immediately above, a rigid shank for said implement, having an upper end portion curved about said axis, means directly behind said shank to support the curved portion thereof for adjustment about said axis, and devices to raise and lower said shank by practically an up and down movement thereof bodily.

23. In a cultivator, an implement gang, a blade behind said gang, arranged to move up and down about a forward axis of adjustment, and means carried by said gang to support said blade for said up and down adjustment thereof about said axis, relative to said gang, said axis located directly in front of said blade and below said means.

24. In a cultivator, an implement gang, a blade behind said gang, arranged to move forward and back about a horizontal axis of adjustment immediately above, a shank for said blade, means engaging said shank to support said blade for said adjustment thereof about said axis, and devices carried by said gang and affording adjustment of said means to raise and lower the shank and blade bodily, both of said adjustments being relative to said gang.

25. A cultivator comprising a pair of gangs, leveling blades behind said gangs, and guards between said gangs, said blades being disposed at angles to throw the soil outward, and said gangs being arranged to throw the soil inward against said guards, said guards being carried entirely by said blades and united therewith in fixed relation thereto.

26. A cultivator comprising a leveling blade, means to raise and lower said blade about an axis disposed a distance ahead, and means to adjust said blade about another axis to regulate the action thereof, said axes being disposed substantially in the same plane, and one axis being oblique to the other when viewed from above.

27. A cultivator comprising a leveling blade, means to raise and lower said blade about an axis disposed a distance ahead, and means to adjust said blade about another axis to regulate the action thereof, said axes being disposed substantially in the same plane, and one axis being oblique to the other when viewed from above, and means to shift the blade sidewise.

28. A cultivator comprising a leveling blade, means to raise and lower said blade about an axis disposed a distance ahead, and means to adjust said blade about another axis to regulate the action thereof, said axes being disposed substantially in the same plane, and one axis being oblique to the other when viewed from above, and means to tilt said plane about an axis extending in the direction of travel.

29. A cultivator comprising a leveling blade, means to raise and lower said blade about an axis disposed a distance ahead, and means to adjust said blade about another axis to regulate the action thereof, said axes being disposed substantially in the same plane, and one axis being oblique to the other when viewed from above, and a pivot between the ends of said blade for tilting the same to raise or lower either end thereof.

30. A cultivator comprising a leveling blade, means to raise and lower said blade about an axis disposed a distance ahead, and means to adjust said blade about another axis to regulate the action thereof, said axes being disposed substantially in the same plane, and one axis being oblique to the other when viewed from above, the raising and lowering of said blade causing said plane to tilt forward and backward about said first mentioned axis.

31. A cultivator comprising a leveling blade, means to raise and lower said blade about an axis disposed a distance ahead, and means to adjust said blade about another axis to regulate the action thereof, said axes being disposed substantially in the same plane, and one axis being oblique to the other when viewed from above, said plane being horizontal when said blade occupies a position substantially midway between the highest and lowest positions thereof.

ALVARO S. KROTZ.

Witnesses:
NORMAN C. MILLIKEN, Jr.,
WM. SULLIVAN.

Copies of this patent may be obtained for five cents each, by addressing the "Commissioner of Patents, Washington, D. C."